United States Patent [19]

Schirmann

[11] Patent Number: 4,524,084

[45] Date of Patent: Jun. 18, 1985

[54] PROCESS FOR THE OBTENTION OF AN ALGAE BEVERAGE

[75] Inventor: Francis Schirmann, Strasbourg, France

[73] Assignee: Klein-Wanner Societe Anonyme, Ingwiller, France

[21] Appl. No.: 520,132

[22] Filed: Aug. 3, 1983

[30] Foreign Application Priority Data

Aug. 5, 1982 [FR] France ............................ 82 13831

[51] Int. Cl.³ .............................................. A23L 2/04
[52] U.S. Cl. ................................... 426/590; 426/599; 426/655
[58] Field of Search ............... 426/599, 590, 655, 429, 426/615

[56] References Cited

U.S. PATENT DOCUMENTS 2,811,451 10/1957 Tjoa .................................... 426/655

FOREIGN PATENT DOCUMENTS 54-20175  2/1979  Japan .................................. 426/615
55-37225  9/1980  Japan .................................. 426/655
57-99178  6/1982  Japan .................................. 426/599

*Primary Examiner*—George Yeung
*Attorney, Agent, or Firm*—Young & Thompson

[57] ABSTRACT

The present invention relates to a process for the obtention of an algae beverage, and an algae beverage thus obtained.

The process is characterized in that it consists essentially in cutting and finely chopping a marine algae known as fucus vesiculosus, keeping it in an oven for about 24 hours at a temperature of the order of 120° C., measuring the degree of humidity upon leaving the oven, and adding alcohol whose alcoholometric degree is comprised between 40% and 65% according to the size of the evaporation loss, at the rate of about 10% by weight of the algae from the oven, then macerating the obtained mixture for about three weeks in a closed receptacle, at ambient temperature, then filtering said mixture and pressing the solids content, thereby to separate all the concentrated liquor, then forming a mixture of the concentrated liquor with a fruit concentrate as well as, if desired, with one or several concentrated essences of fruits, vegetables, or herbs, and with water, and finally, pasteurizing the obtained product at about 85° C. for about 20 minutes.

7 Claims, No Drawings

PROCESS FOR THE OBTENTION OF AN ALGAE BEVERAGE

The present invention relates to the field of food industries, particularly beverages, and has for its object a process for the obtention of an algae beverage.

The invention also has for its object an algae beverage obtained by the use of this process.

At present, beverages available on the market, particularly socalled refreshment beverages, are generally constituted by sugar, water and fruit or plant extracts.

These beverages permit slaking the thirst and proper refreshment, but have nevertheless the disadvantage of containing ingredients of more or less high calorie count, whereby their consumption is not always compatible with a diet, particularly a low calorie diet.

The present invention has for its object to overcome this drawback.

Accordingly, it has for its object a process for obtaining an algae beverage, characterized in that it consists essentially in cutting and finely chopping a marine alga termed fucus vesiculosus or sea oak or also bladder rack (vesicular kelp), keeping it in an oven about 24 hours at a temperature of the order of 120° C., measuring the degree of humidity at the exit of the oven, and adding alcohol whose alcoholometric degree is between 40° and 65° according to the size of the evaporation loss, at the rate of about 10% by weight of the heated algae, then macerating the mixture thus obtained for about three weeks in a closed receptacle, at ambient temperature, then filtering said mixture, and pressing the solids content, so as to separate therefrom all the concentrated liquor, then effecting a mixture of the concentrated liquor with a fruit concentrate as well as possibly one or more concentrates of essence of fruits, of vegetables, or of herbs, and with water and finally pasteurizing the obtained product at about 75° C. for about 20 minutes.

The alga fucus vesiculosus used has preferably a high iodine content and is preferably harvested in February and in September.

The alcoholometric degree of the alcohol mixed with the algae upon leaving the oven is a function of the moisture content of said algae, and is preferably between 45° and 65°.

As an example:

for a weight loss of algae in the oven of 30%, the alcohol used has a titre of 60° to 65°, for a weight loss of 40%, the alcohol titre is 50°, and for a weight loss of 50%, the alcohol titre is 40° to 45°.

The concentrated liquor obtained after maceration, filtering and pressing is mixed in a proportion between 1% and 30%, preferably between 1% and 5%, with added water and if desired with one or more essences of fruit, or of other plants, in a proportion between 6% and 8% for each essence, and, if appropriate with a substantially corresponding proportion of citric acid to effect stabilization of the pH.

As basic essence, is contemplated particularly lemon or orange concentrate, but other fruit concentrates may be used without limitation. However the use of other concentrates requires the addition of citric acid, so as to stabilize the pH of the mixture produced.

Also, other plant concentrates may be added to the mixture such as hawthorn, borage, sorrel thorn, cress, etc., in a proportion substantially identical to that of the fruit concentrate.

The invention also has for its object an algae beverage obtained by use of the process described above, characterized in that it is constituted by an aqueous mixture of concentrated juice of fucus vesiculosus and of a fruit concentrate, such as lemon or orange, or the like, and optionally of another plant concentrate such as hawthorn, borage, sorrel thorn, cress, etc., the addition of a fruit concentrate other than lemon requiring a corresponding addition of citric acid.

By way of example, the algae beverage according to the invention has the following preferred composition:

1% to 5% of concentrated juice of fucus vesiculosus

6% to 8% of concentrated lemon juice water g.s.p. 1000.

According to a modified embodiment of the invention, the beverage has the following preferred composition:

1% to 5% of fucus vesiculosus

6% to 8% of concentrated orange juice

6% to 8% of citric acid

6% to 8% of hawthorn, borage, sorrel thorn, or cress water q.s.p. 1000.

Thanks to the invention, it is possible to provide an aromatic beverage of algae, very thirst quenching and leaving an aftertaste of oysters. Moreover, such a beverage is obtained without the addition of sugar, whereby its calorie content is zero.

Of course, the invention is not limited to the described embodiment. Modifications remain possible, particularly as to the proportions and nature of the various constituents, without thereby departing from the scope of protection of the invention.

I claim:

1. Process for the obtention of an algae beverage, comprising cutting and finely chopping a marine alga comprising fucus vesiculosus, keeping it in an oven for about 24 hours at a temperature of about 120° C., adding thereto an alcohol-water solution having a volume ratio of alcohol to water of 40/60 to 65/35, in the amount of about 10% by weight of the algae heated in the oven, then macerating the obtained mixture for about three weeks in a closed receptacle, at ambient temperature, then filtering said mixture and pressing the solids content, so as to remove therefrom all the liquor, then producing a mixture of the liquor thus obtained with a fruit concentrate and with water, and finally, pasteurizing the obtained product at about 75° C. for about 20 minutes.

2. Process according to claim 1, wherein for a weight loss of the algae in the oven of 30%, the alcohol-water solution added has a said ratio of about 40/60.

3. Process according to claim 1, wherein for a weight loss of the algae in the oven of 40%, the alcohol-water solution added has a said ratio of about 50/50.

4. Process according to claim 1, wherein for a weight loss of the algae in the oven of 50%, the alcohol-water solution added has a said ratio of 40/60 to 45/55.

5. Process according to claim 1, wherein the liquor obtained after maceration, filtration and pressing is mixed in a proportion of 1% to 30% by weight with added water and with a fruit concentrate in a proportion comprised between 6% and 8% by weight, and adding citric acid to effect stabilization of the pH.

6. Process according to claim 1, and adding a concentrate of a plant selected from the group consisting of hawthorn, borage, sorrel thorn and cress to the mixture, in a proportion substantially identical to that of the fruit concentrate.

7. Algae beverage obtained by the process according to claim 1.

* * * * *